US012562020B2

(12) United States Patent
Donaghey

(10) Patent No.: US 12,562,020 B2
(45) Date of Patent: Feb. 24, 2026

(54) VENDING MACHINE SYSTEM

(71) Applicant: SodaX Pty Ltd, Scoresby (AU)

(72) Inventor: Andrew Donaghey, Mulgrave (AU)

(73) Assignee: SodaX Pty Ltd, Scoresby (AU)

( * ) Notice: Subject to any disclaimer, the term of this patent is extended or adjusted under 35 U.S.C. 154(b) by 568 days.

(21) Appl. No.: 18/049,819

(22) Filed: Oct. 26, 2022

(65) Prior Publication Data

US 2023/0135405 A1 May 4, 2023

Related U.S. Application Data

(63) Continuation of application No. PCT/AU2021/050378, filed on Apr. 27, 2021.

(30) Foreign Application Priority Data

Apr. 27, 2020 (AU) ................................ 2020901325

(51) Int. Cl.
*G07F 7/06* (2006.01)
*G07F 7/00* (2006.01)
(Continued)

(52) U.S. Cl.
CPC ............ *G07F 7/0609* (2013.01); *G07F 7/005* (2013.01); *G07F 9/001* (2020.05); *G07F 9/006* (2013.01);
(Continued)

(58) Field of Classification Search
CPC ........ G07F 7/0609; G07F 7/005; G07F 9/001; G07F 9/006; G07F 9/009; G07F 11/16;
(Continued)

(56) References Cited

U.S. PATENT DOCUMENTS

| | | | | |
|---|---|---|---|---|
| 4,778,042 A * | 10/1988 | Warren | G07F 11/58 194/212 |
| 5,829,630 A * | 11/1998 | Fernald | G07F 7/0609 221/281 |

(Continued)

FOREIGN PATENT DOCUMENTS

| | | |
|---|---|---|
| CN | 104536671 A | 4/2015 |
| EP | 0848359 A1 | 6/1998 |

(Continued)

*Primary Examiner* — Michael Collins
(74) *Attorney, Agent, or Firm* — Stephen J. Kenny; Nicole A. Bustos-Pomerantz; Foley Hoag LLP

(57) ABSTRACT

A vending machine system for exchanging $CO_2$ gas cylinders, the system including a controller in communication with a user interface, a payment system and an array of bin assemblies, wherein each one of the bin assemblies is shaped to at least partially receive an end of a $CO_2$ gas cylinder and includes a locking system for releasably securing therein a $CO_2$ gas cylinder, said system for performing the steps of (a) receiving user input through the user interface; and (b) if the user input represents a desire to exchange a $CO_2$ gas cylinder, then the system performs the steps of (i) receiving payment from the user through the payment system for a replacement $CO_2$ gas cylinder; (ii) receiving a $CO_2$ gas cylinder in a first one of said bin assemblies; and (iii) the locking system releasing a full $CO_2$ gas cylinder located in a second one of said bin assemblies for collection by the user.

32 Claims, 12 Drawing Sheets

(51) Int. Cl.

| | |
|---|---|
| ***G07F 9/00*** | (2006.01) |
| ***G07F 11/16*** | (2006.01) |
| ***G07F 11/62*** | (2006.01) |
| ***G07F 17/00*** | (2006.01) |

(52) U.S. Cl.
CPC .............. *G07F 9/009* (2020.05); *G07F 11/16* (2013.01); *G07F 11/62* (2013.01); *G07F 17/0014* (2013.01)

(58) Field of Classification Search
CPC ...... G07F 11/62; G07F 17/0014; G07F 9/002; G07F 11/46; G07F 17/0042; G07F 11/005; G07F 7/08; G07F 11/007; G07F 17/12; F17C 2270/0736; F17C 1/00; A47F 1/04
See application file for complete search history.

(56) References Cited

U.S. PATENT DOCUMENTS

| | | | | |
|---|---|---|---|---|
| 6,192,296 | B1 * | 2/2001 | Colmant | G07F 17/12 700/214 |
| 6,553,128 | B1 * | 4/2003 | Jouvaud | G06Q 10/087 705/28 |
| 7,228,989 | B2 * | 6/2007 | Bhatti | F25B 5/02 221/95 |
| 7,909,206 | B2 * | 3/2011 | Davis, Jr. | G07F 7/0609 221/124 |
| 8,113,382 | B1 * | 2/2012 | Piersant | G07F 7/0609 221/102 |
| 9,275,508 | B1 * | 3/2016 | Lavra | G06Q 20/3278 |
| 10,078,933 | B2 * | 9/2018 | Clark | G07F 7/0609 |
| 10,580,067 | B1 * | 3/2020 | Cho | G05B 15/02 |
| 2003/0042269 | A1 * | 3/2003 | Blong | G07F 7/0609 221/93 |
| 2007/0034681 | A1 | 2/2007 | Kamiya et al. | |
| 2014/0353998 | A1 * | 12/2014 | White | B60P 3/0257 296/22 |
| 2016/0098695 | A1 * | 4/2016 | Lavra | G06Q 20/352 700/236 |
| 2016/0180628 | A1 * | 6/2016 | Clark | G07F 5/26 700/236 |
| 2016/0240032 | A1 * | 8/2016 | Agor | G07F 11/62 |
| 2016/0284153 | A1 | 9/2016 | Tansey, Jr. et al. | |
| 2016/0364930 | A1 * | 12/2016 | Chalise | F17C 13/084 |
| 2017/0140600 | A1 * | 5/2017 | Halsey, Jr. | G06K 19/077 |
| 2017/0337722 | A1 | 11/2017 | Sullivan et al. | |
| 2019/0082297 | A1 | 3/2019 | Poda | |
| 2023/0129968 | A1 | 4/2023 | Donaghey | |
| 2023/0138605 | A1 | 5/2023 | Donaghey | |
| 2024/0078620 | A1 * | 3/2024 | Morris | B67D 7/04 |

FOREIGN PATENT DOCUMENTS

| | | | |
|---|---|---|---|
| JP | H03226898 | A | 10/1991 |
| JP | H11269442 | A | 10/1999 |
| JP | 2006-288946 | A | 10/2006 |
| JP | 2008-041031 | A | 2/2008 |
| JP | 2008-097219 | A | 4/2008 |
| JP | 2008-197806 | A | 8/2008 |
| JP | 2011-145987 | A | 7/2011 |
| JP | 2018-092380 | A | 6/2018 |
| JP | 6522838 | B1 | 5/2019 |
| JP | 2019-113924 | A | 7/2019 |
| WO | WO-2015/089096 | A1 | 6/2015 |
| WO | WO-2016/074924 | A1 | 5/2016 |
| WO | WO-2020/161159 | A1 | 8/2020 |

* cited by examiner

VENDING MACHINE SYSTEM

CROSS-REFERENCE TO RELATED APPLICATIONS

This application is a continuation of International Application No. PCT/AU2021/050378, filed on Apr. 27, 2021, which claims the benefit of priority to Australian Patent Application No. 2020901325, filed on Apr. 27, 2020. The entirety of each of these applications is hereby incorporated herein by reference.

TECHNICAL FIELD

The present invention relates to a vending machine system, a bin assembly, an array of bin assemblies and a vending machine.

BACKGROUND

A popular way to make your own bubbly drinks at home is by way of a sparkling water maker, such as the one made by SodaStream™. The sparkling water makers typically come with:

(a) sparkling drink maker housing;
(b) a plastic carbonating bottle; and
(c) a $CO_2$ cylinder.

Usage of the sparkling water maker depletes the $CO_2$ in the cylinder and, as such, the cylinder will need to be replaced from time to time.

The cylinders are currently swapped in one of the following ways:

1. Swap Your Cylinder On Shelf In-Store
   a. Customer goes to a store, such as Big W™, where the empty cylinder can be swapped;
   b. Customer grabs off the shelf a full cylinder in box;
   c. Customer take the new cylinder to the checkout;
   d. The cashier scans the bar code of the new cylinder and the cash register displays the full cylinder price;
   e. The cashier scans the empty cylinder and the cash register displays:
      i. the exchange price reduction; and
      ii. the exchange price; and
   g. The customer then pays the exchange price and takes the full cylinder home.
2. Swap Your Cylinder at the Counter Take your empty SodaStream™ cylinder to the counter at your local Target™, Myer™, Kmart™, or David Jones™ to swap for a full one, with a customer assistant.

a. Customer goes to store, such as Kmart™, with an empty cylinder;
   b. Customer requests the store attendant to exchange an empty cylinder for a full one;
   c. Store attendant takes customer's empty cylinder;
   d. Store attendant gets a full cylinder from behind the counter and scans the barcode;
   e. The cash register displays the exchange price; and
   f. The customer then pays the exchange price and takes the full cylinder home.

It may not be convenient for the customer to travel all the way to a store to swap the cylinder in the manner set out in items 1 and 2 above. This may particularly be the case when the weather is inclement and/or travel is restricted.

Further, the above described system relies on the cashier, and ultimately the store owner, collecting the empty cylinders and contacting the sparkling water maker for collection and refilling. A difficulty here is that the sparkling water maker does not know, at any given point in time, how many empty cylinders are being collected by the stores that they supply. Further again, how human error may lead to cylinders not being collected in total by the store. They tend to go missing.

In an attempt to address some of the above issues, the replacement process has been localised at some petrol stations, such as those including a Coles Express™ Store. The improved process includes the steps of:

a. Customer goes to petrol station stocking the replacement cylinders with an empty cylinder;
b. Cashier scans the bar code of the empty cylinder or a pre-printed bar code;
c. The cash register displays the exchange price;
d. The customer then pays the exchange price;
e. The customer is given a key to the cage of replacement cylinders;
f. Customer unlocks the cage and replaces the empty cylinder with a full one; and
g. The customer returns the key to the cashier and takes the full cylinder home.

Being able to sway a cylinder at a local petrol station may be more convenient than travelling to a large store. However, the above described process is time consuming and relies on a large number of mechanical human step, including the locking and unlocking of cages. Issues can arise with theft, for example, where the customer does not lock the cage properly. Also, the lack of security with the cage lends itself to the customer taking more than one cylinder without paying.

Also, as per processes 1 and 2, the petrol station process still relies on the cashier, and ultimately the store owner, collecting the empty cylinders and contacting the sparkling water maker for collection and refilling. Again the difficulty here is that the sparkling water maker does not know, at any given point in time, how many empty cylinders are being collected by the stores that they supply. Further again, how human error may lead to cylinders not being collected in total by the store. They tend to go missing.

It is generally desirable to overcome or ameliorate one or more of the above described difficulties, or to at least provide a useful alternative.

SUMMARY

In accordance with the invention, there is provided a vending machine system for exchanging $CO_2$ gas cylinders, the system including a controller in communication with a user interface, a payment system and an array of bin assemblies, wherein each one of the bin assemblies is shaped to at least partially receive an end of a $CO_2$ gas cylinder and includes a locking system for releasably securing therein a $CO_2$ gas cylinder, said system for performing the steps of:

(a) receiving user input through the user interface; and
(b) if the user input represents a desire to exchange a $CO_2$ gas cylinder, then the system performs the steps of:
   (i) receiving payment from the user through the payment system for a replacement $CO_2$ gas cylinder;
   (ii) receiving a $CO_2$ gas cylinder in a first one of said bin assemblies; and
   (iii) the locking system releasing a full $CO_2$ gas cylinder located in a second one of said bin assemblies for collection by the user.

Preferably, step (ii) is performed by the system before step (i). Step (a) of receiving user input is preferably the same as the step (ii) of receiving a $CO_2$ gas cylinder.

Preferably, each one of the bin assemblies includes an authentication system for confirming that an item received therein is a legitimate $CO_2$ gas cylinder, said the system for performing the step of confirming through the authentication system that the item received in step (ii) is a legitimate $CO_2$ gas cylinder.

Preferably, if said user input represents a desire to purchase a full $CO_2$ gas cylinder without replacement, then the system performs the steps of:

(a) receiving payment from the user through the payment system for a full $CO_2$ gas cylinder without replacement; and (b) the locking system releasing a full $CO_2$ gas cylinder located in a third one of said bin assemblies for collection by the user.

In accordance with the invention, there is also provided a vending machine system for purchasing a $CO_2$ gas cylinder, the system including a controller in communication with:

(a) a user interface;

(b) a payment system; and (c) an array of bin assemblies, wherein each one of bin assemblies is shaped to at least partially receive an end of a $CO_2$ gas cylinder and includes a locking system for releasably securing therein a $CO_2$ gas cylinder, said system for performing the steps of:

(a) receiving user input through the user interface; and (b) if the user input represents a desire to purchase a $CO_2$ gas cylinder, then the system performs the steps of:

(i) receiving payment from the user through the payment system for a $CO_2$ gas cylinder; and (ii) the locking system releasing a $CO_2$ gas cylinder located in a one of said bin assemblies for collection by the user.

In accordance with the invention, there is also provided a vending machine system for receiving spent $CO_2$ gas cylinders, the system including a controller in communication with:

(a) a user interface;

(b) a payment system; and (c) an array of bin assemblies, wherein each one of bin assemblies is shaped to at least partially receive an end of a $CO_2$ gas cylinder and includes a locking system for releasably securing therein a $CO_2$ gas cylinder, said system for performing the steps of:

(a) receiving user input through the user interface; and (b) if the user input represents a desire to return a $CO_2$ gas cylinder, then the system performs the steps of:

(i) receiving an item in one of said bin assemblies;

(ii) the locking system locking the $CO_2$ gas cylinder in said one of said bin assemblies;

(iii) issuing a credit to the user through the payment for return of $CO_2$ gas cylinder without replacement.

Preferably, step (a) of receiving user input is the same as the step (i) of receiving a $CO_2$ gas cylinder.

Preferably, each bin assembly in the array includes a tubular chassis shaped to receive and seat therein a $CO_2$ gas cylinder. The locking system of each bin assembly in the array includes a sled that engages the $CO_2$ gas cylinder as it is inserted in to the tubular chassis and translates with respect to the tubular chassis towards a locked position.

In accordance with the invention, there is also provided a bin assembly for an array of bin assemblies of a $CO_2$ gas cylinder vending machine system, wherein the bin assembly is shaped to at least partially receive an end of a $CO_2$ gas cylinder and includes a locking system for releasably securing therein a $CO_2$ gas cylinder.

Preferably, the bin assembly includes an authentication system for confirming that an item received therein is a legitimate $CO_2$ gas cylinder. The bin assembly includes a tubular chassis shaped to receive and seat therein a $CO_2$ gas cylinder. The locking system includes a sled that engages the $CO_2$ gas cylinder as it is inserted in to the tubular chassis and translates with respect to the tubular chassis towards a locked position.

In accordance with the invention, there is also provided an array of the above-described bin assemblies.

In accordance with the invention, there is also provided a vending machine, including the above described system.

The vending machine system can be installed in any convenient location with 24 hour access. Customers (also referred to as "users") can use the vending machine system to swap an empty $CO_2$ gas cylinder for a full $CO_2$ gas cylinder.

Being able to sway a cylinder at a local vending machine of the above described type is more convenient than travelling to a large store. Furthermore, exchanging $CO_2$ gas cylinder using the above described vending machine minimises reliance on human steps for locking and unlocking of cages. The vending machine makes theft of $CO_2$ gas cylinders more difficult.

Further, the vending machine securely collects and safely stores returned $CO_2$ gas cylinders. As such, accurate stock of cylinders is maintained by the vending machine.

BRIEF DESCRIPTION OF THE DRAWINGS

Preferred embodiments of the invention are hereafter described, by way of non-limiting example only, with reference to the accompanying drawings, in which.

DETAILED DESCRIPTION

Figure 1:
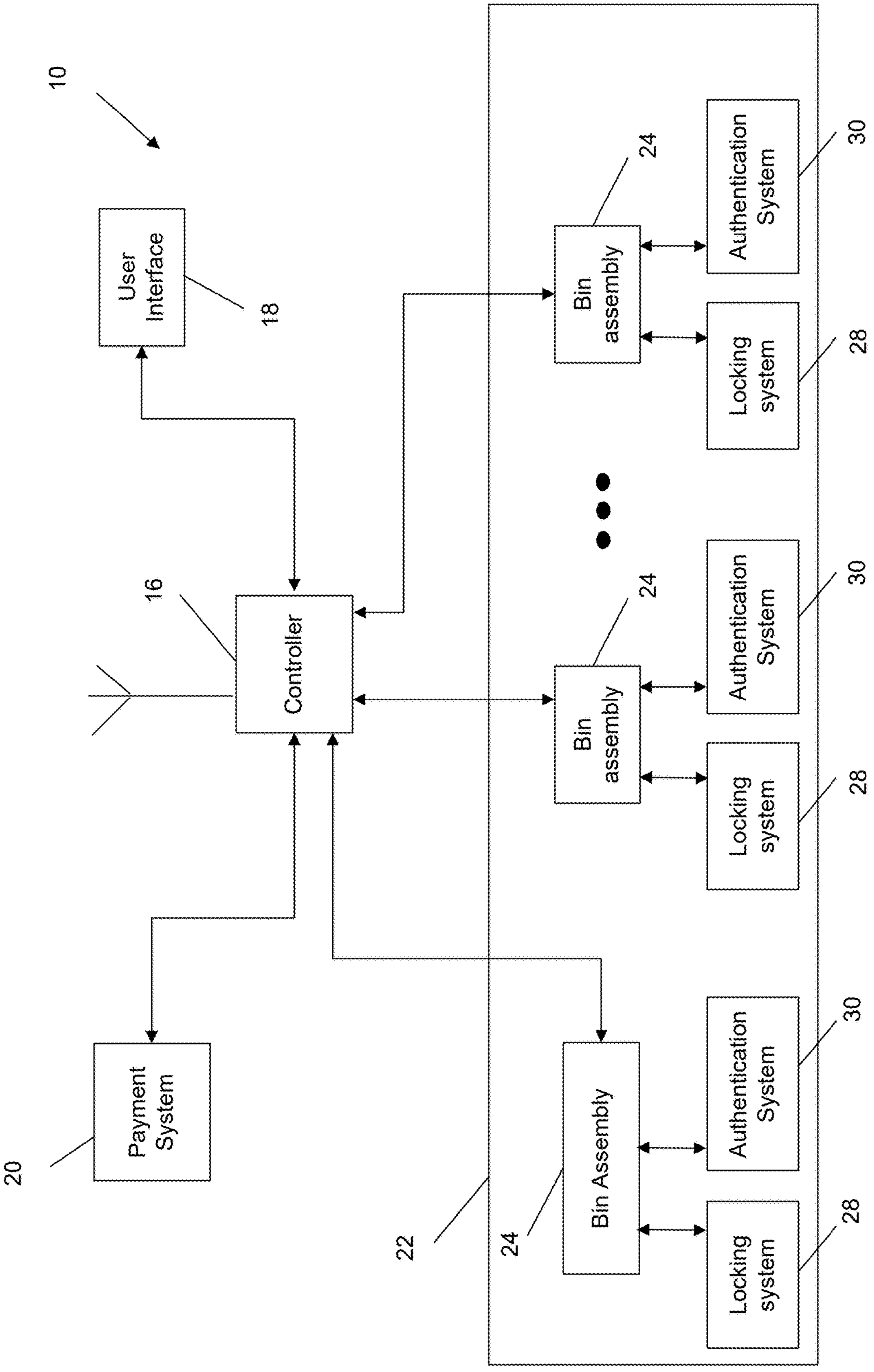
FIG. 1 is a schematic diagram of a vending machine system.
Figure 2:
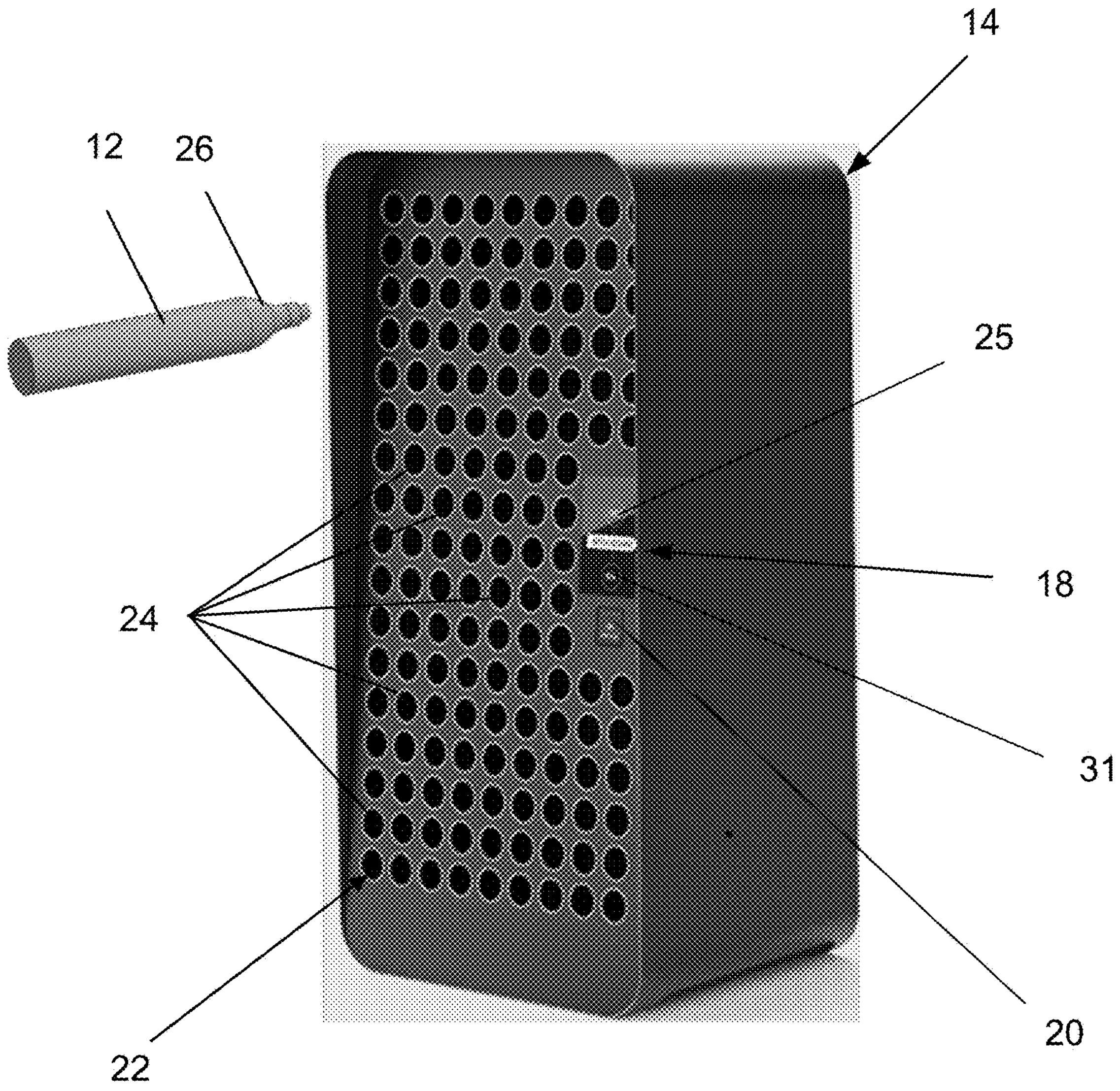
FIG. 2 is a perspective view of a $CO_2$ cylinder and a vending machine that embodies the system of FIG. 1.

The vending machine system 10 shown in FIG. 1 is used for exchanging $CO_2$ gas cylinders 12. The system 10 is advantageously embodied as a standalone vending machine 14 as shown in FIG. 2 for swapping and buying new $CO_2$ cylinders. Alternatively, the components of the system 10 can be distributed over different locations and are in communication on standard communication networks using standard communication protocols.

The vending machine 14 can be installed in any convenient location with 24 hour access, for example. Customers (also referred to as "users") can use the vending machine 14 to swap an empty $CO_2$ gas cylinder 12 for a full $CO_2$ gas cylinder.

As shown in FIG. 1, the system 10 includes a controller 16 in communication with a user interface 18, a payment system 20 and an array 22 of bin assemblies. Each one of the bin assemblies 24 is shaped to at least partially receive an end 26 of a $CO_2$ gas cylinder 12 and includes a locking system 28 for releasably securing therein a $CO_2$ gas cylinder 12.

Advantageously, the system 10 also includes an authentication system 30 for confirming that an item received therein is a legitimate $CO_2$ gas cylinder 12.

Figure 3:
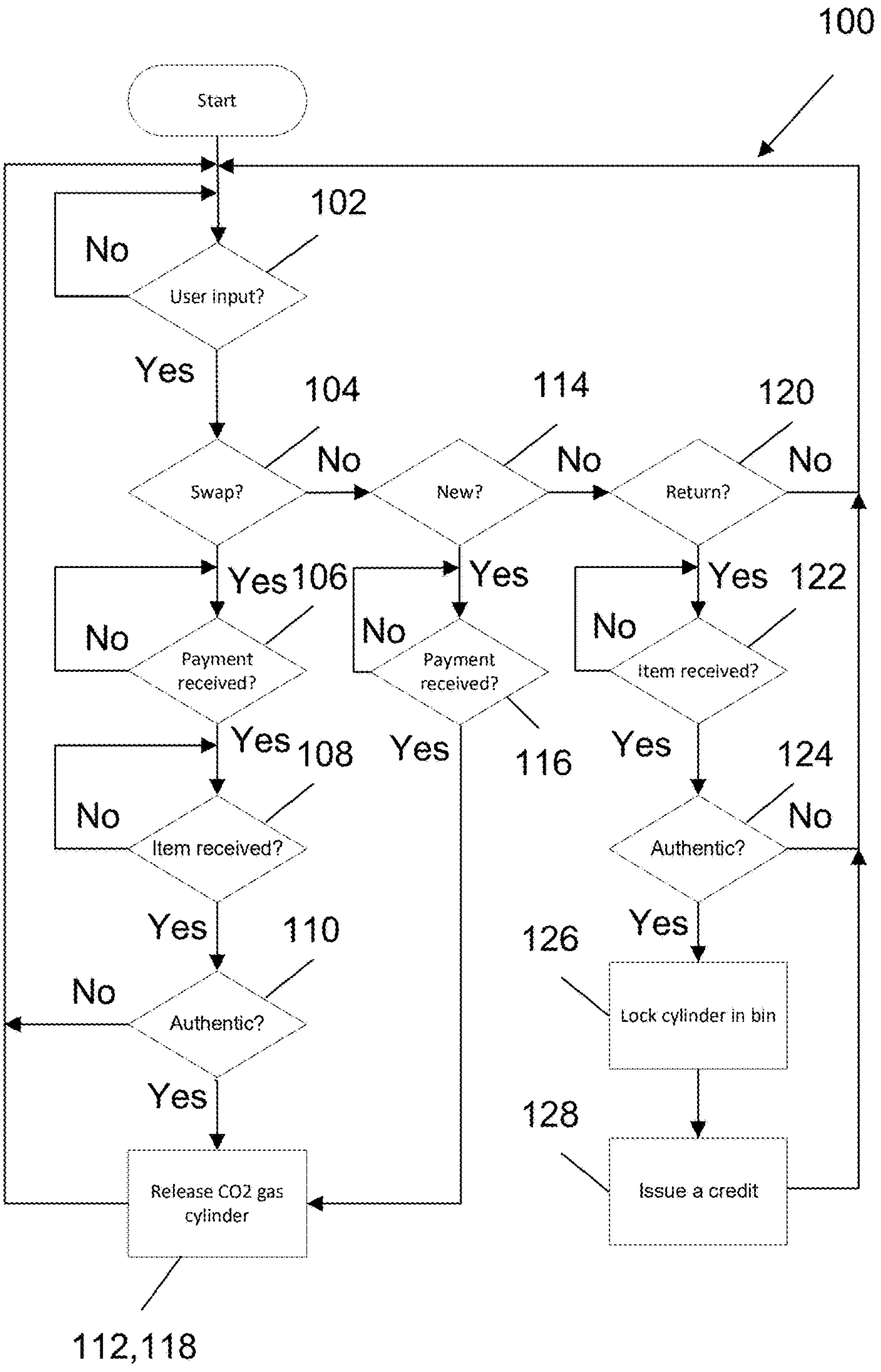
FIG. 3 is a flow diagram showing steps performed by the system shown in FIG. 1.

The system 10 performs the process 100 shown in FIG. 3, including the step of receiving, at step 102, user input through the user interface 18. If, at step 104, the user input represents a desire to exchange a $CO_2$ gas cylinder, then the system 100 performs the steps of:

(a) receiving, at step 106, payment from the user through the payment system 20 for a replacement $CO_2$ gas cylinder 12;

(b) receiving, at step 108, an item in a first one of the bin assemblies 24;

(c) confirming, at step 110, through the authentication system 30 that the item is a legitimate $CO_2$ gas cylinder; and (d) the locking system 28 releasing, at step 112, a full $CO_2$ gas cylinder 12 located in a second one of the bin assemblies 24 for collection by the user.

Advantageously, steps 106 and 108 can be performed in any order. For example, the step 106 of receiving payment can occur after the step 108 of receiving the item. In this embodiment, the step 102 of receiving user input could advantageously be equivalent to the step 108 of receiving an item. To this end, a customer could initiate an exchange by simply inserting a spent $CO_2$ gas cylinder into an empty bin assembly 24.

The user interface 18 shown in FIG. 2 includes a "Swap" function button 25 that is used to represent a desire to exchange a $CO_2$ gas cylinder 12.

The user can perform this function by simply inserting the expired $CO_2$ cylinder 12 into an empty bin assembly 24 in the array 22, making a selection through the user interface 18 and making a payment through the payment system 20. The process is efficient and convenient with minimal human interaction. No issues arise with theft.

Further, the returned empty $CO_2$ gas cylinders 12 are securely stored in the machine 14. As such, there are no issues with the cylinders 12 not being collected properly by cashiers and cylinders 12 going missing.

In order to release a $CO_2$ gas cylinder 12, the controller 16 electronically triggers the locking system 28 on an appropriate bin assembly 24 to open. In response to this request, the locking system 28 releases the cylinder 12 to the user.

The step, 112, of releasing the $CO_2$ gas cylinder 12 preferably includes the step of identifying a suitable cylinder 12 to release. Advantageously, the locking system 28 releases a full $CO_2$ gas cylinder 12 from a bin 24 in the array 22 that is closest to the bin 24 where the empty $CO_2$ gas cylinder 12 was returned.

The system 10 preferably illuminates an LED ring on the empty bin assembly 24 selected to receive the empty $CO_2$ gas cylinder 12 from the user.

If, at step 114, the user input received represents a desire to purchase a full $CO_2$ gas cylinder 12 without replacement, then the system 10 performs the steps of:

(a) receiving, at step 116, payment from the user through the payment system 20 for a full $CO_2$ gas cylinder 12 without replacement; and (b) the locking system 28 releasing, at step 118, a full $CO_2$ gas cylinder 12 located in one of the bin assemblies 24 for collection by the user.

The user interface 18 shown in FIG. 2 includes a "New" function button 31 that is used to represent a desire to purchase a full $CO_2$ gas cylinder 12 without replacement.

The step 118 of releasing the $CO_2$ gas cylinder 12 preferably further includes the steps of:

(a) engaging a height measurement system to measure a height of the user; and (b) the locking system 28 identifying a bin assembly 24 with a full $CO_2$ gas cylinder 12 that is closest to the height of the user.

In doing so, the system 10 releases a cylinder 12 in a bin assembly 24 that relates to the height of the user:

short person/disabled person, lower bin assembly 24 selected tall person, higher bin assembly 24 selected.

If, at step 120, the user input represents a desire to return an empty $CO_2$ gas cylinder 12 without replacement, then the system 10 performs the steps of:

(a) receiving, at step 122, an item in one of the bin assemblies 24;

(b) confirming, at step 124, through the authentication system 30 that the item is a legitimate $CO_2$ gas cylinder 12;

(c) the locking system locking, at step 126, the cylinder 12 in the bin assemblies 24;

(d) issuing, at step 128, a credit to the user through the payment system 20 for return of $CO_2$ gas cylinder 12 without replacement.

The system 10 preferably illuminates an LED ring on the empty bin assembly 24 selected to receive the empty $CO_2$ gas cylinder 12 from the user.

Advantageously, the system 10 performs the additional steps of asking the user if they want a receipt of the transaction through the user interface 18. The transaction being the conclusion of the exchange of a $CO_2$ gas cylinder 12, the purchase of a new $CO_2$ gas cylinder or the return of a $CO_2$ gas cylinder. This may be done by generating indicia on a display, for example. On receipt of confirmation from the user through the interface 18, the system 10 generates a receipt for the transaction. The system 10 then performs the step of providing the receipt to the user. This is done by printing a physical copy of the receipt for the user through the user interface 18. Alternatively, the receipt is provided by e-mail to the user, where the user enters his or her e-mail address through the user interface 18.

Bin Assembly 24

Figure 4A:
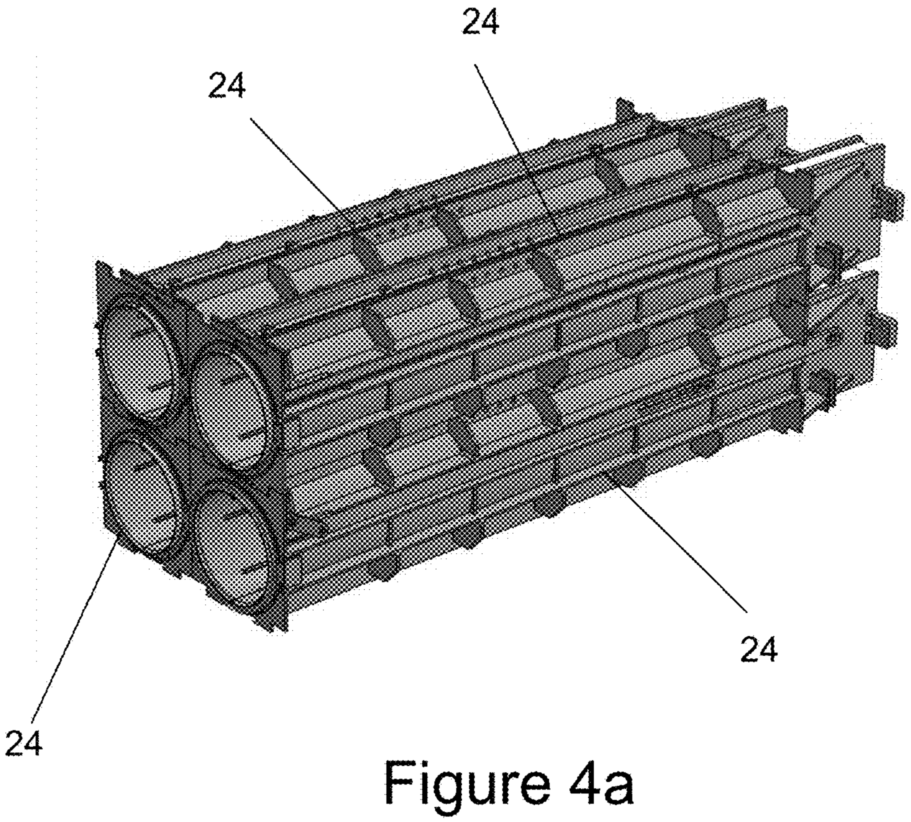
FIGS. 4*a* and 4*b* are perspective views of clusters of bin assemblies in different conditions of use.
Figure 4B:
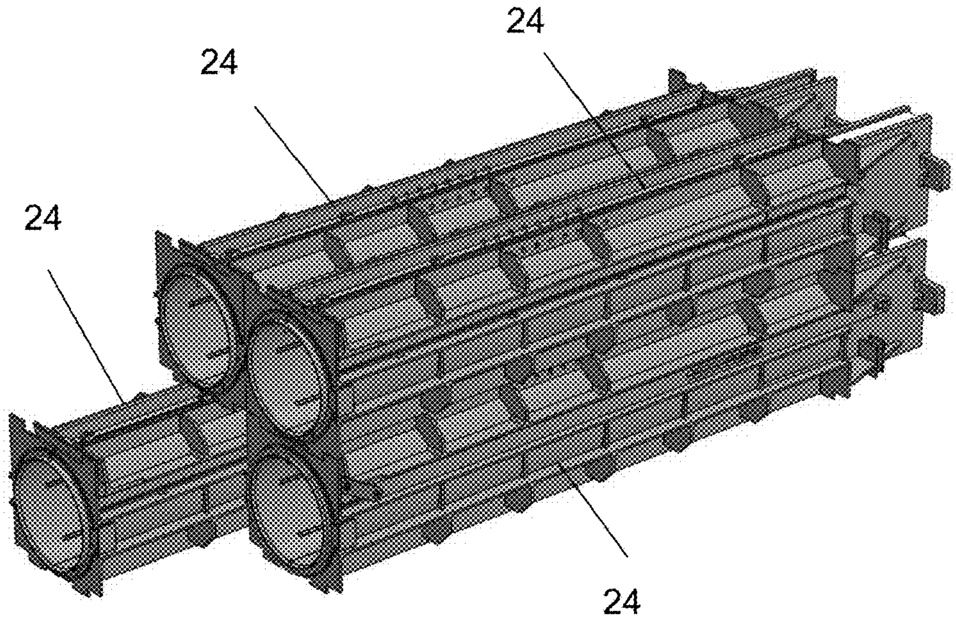
Figure 5A:
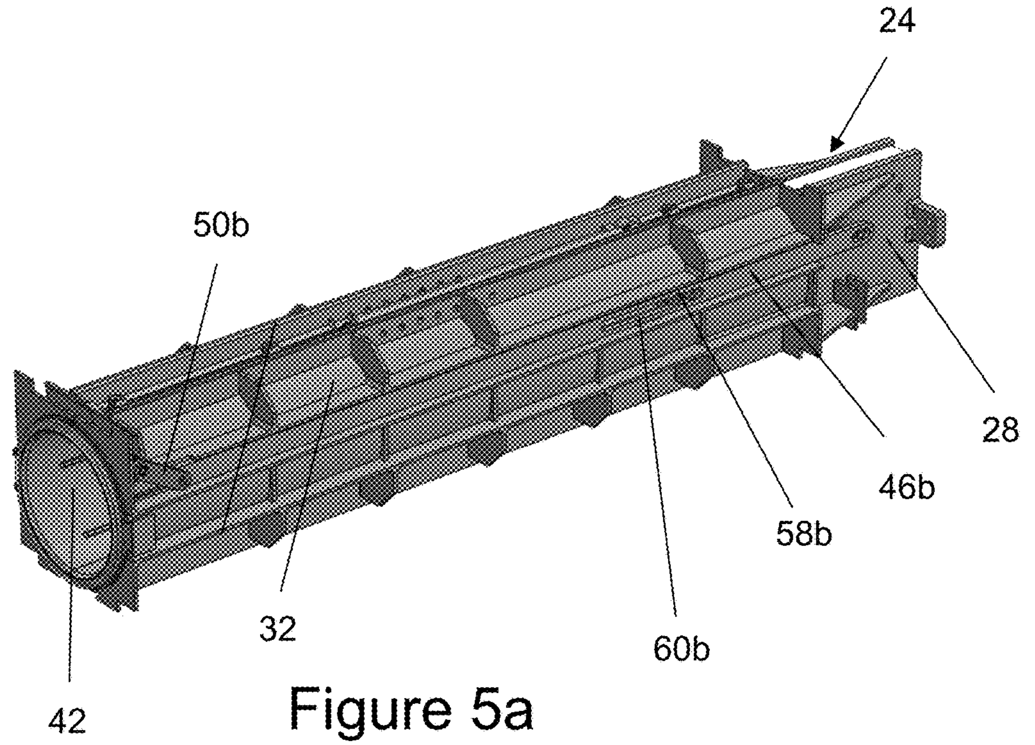
FIGS. 5*a* and 5*b* are perspective views of a bin assembly in different conditions of use.
Figure 5B:
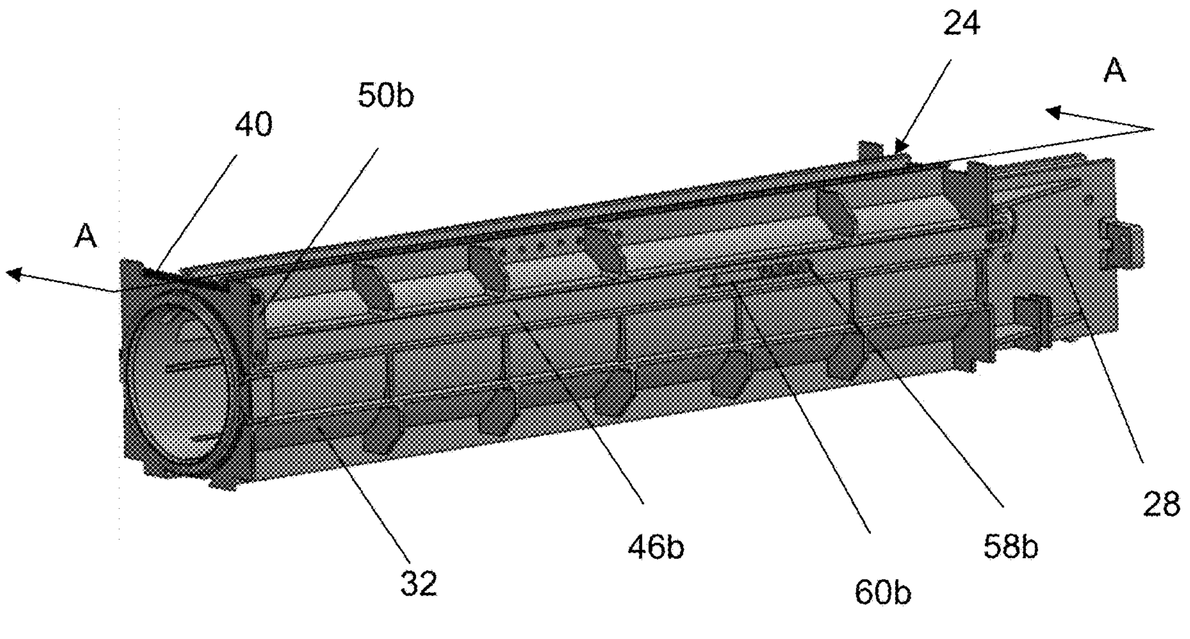

As shown in FIGS. 4*a* and 4*b*, the bin assemblies 24 have a modular structure that allows for easy connection and removal of individual bin assemblies 24 from the array 22. Individual bin assemblies 24 can be joined together in an array 22 of any size. Each individual bin assembly 24 can be slid out of the array 22 and replaced or serviced as needed.

With reference to FIGS. 5*a* to 8*b*, each bin assembly 24 in the array 22 includes a tubular chassis 32 with an open end 42 that is shaped to receive and seat therein a $CO_2$ gas cylinder 12. As shown, the tubular chassis 32 is formed in two parts which facilitates easy assembly. Alternatively, the tubular chassis 32 could be any other shape capable of receiving, and securing therein, an end section of a $CO_2$ gas cylinder 12.

Figure 7:
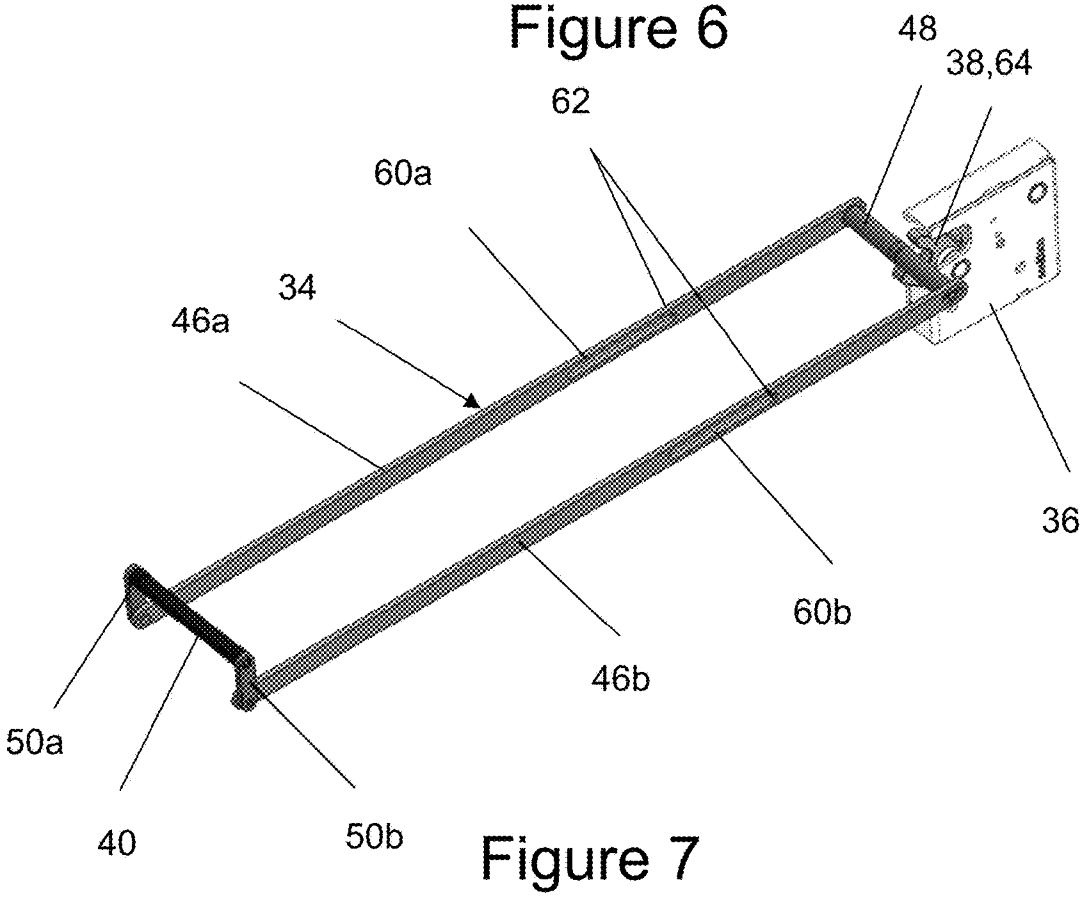
FIG. 7 is a perspective view of a sled of the bin assembly shown in FIG. 5*b*
Figure 8A:
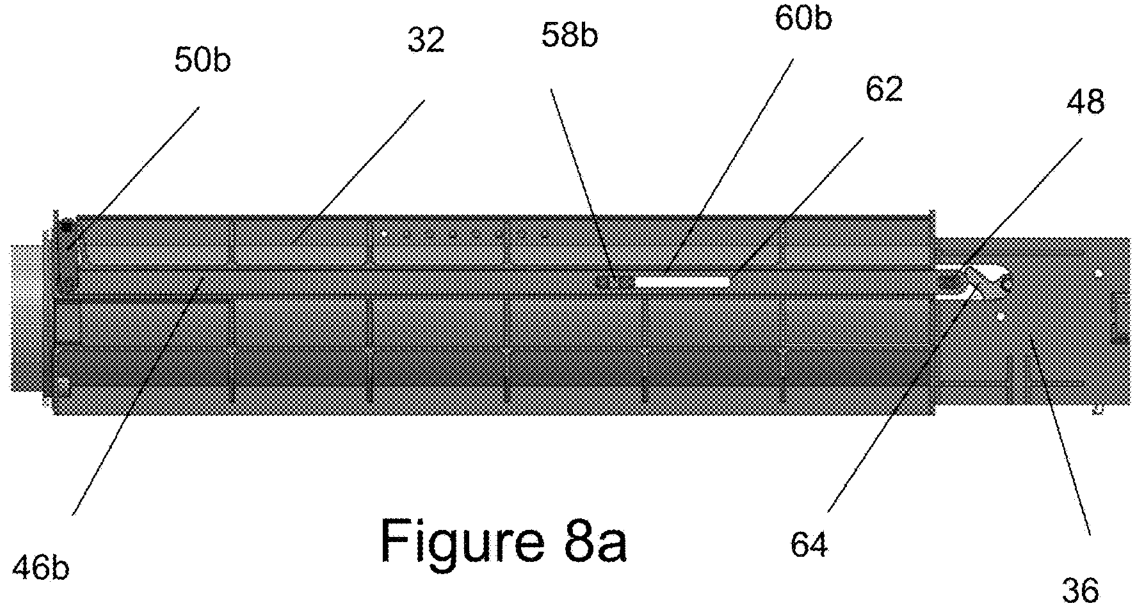
FIG. 8*a* is a side view of the bin assembly shown in FIG. 5*b* with a $CO_2$ gas cylinder partly inserted therein.
Figure 8B:
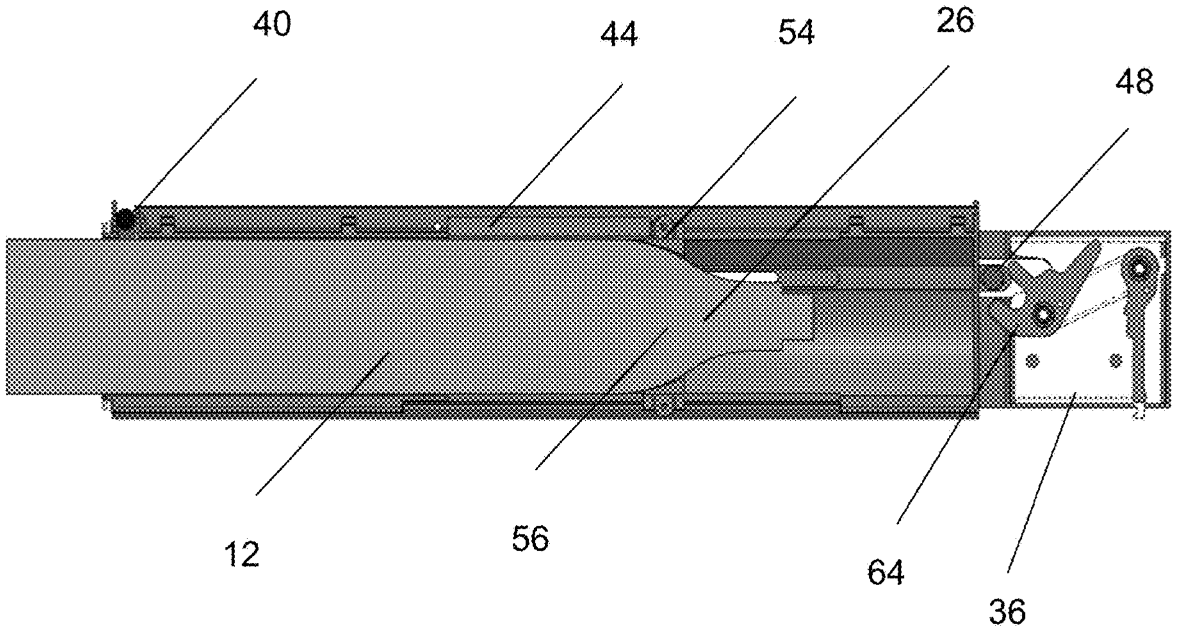
FIG. 8*b* is a section view of the bin assembly shown in FIG. 5*b* with a $CO_2$ gas cylinder partially inserted therein through the line A-A.

As particularly shown in FIG. 7, the locking system 28 of each bin assembly 24 in the array 22 includes a sled 34 that engages the $CO_2$ gas cylinder 12 as it is inserted in to the tubular chassis 32. The sled 34 is adapted to translate with respect to the tubular chassis 32 towards a locked position in the manner shown in FIGS. 9*a* to 9*c*. The sled 34 is in the locked position when the cylinder 12 is fully inserted into the chassis 32, as shown in FIG. 9*c*.

The locking system 28 of each bin assembly 24 also includes a rotary latch 36 that is engaged by the sled 34 as it translates towards the locked position. A latching arm 38 secures the sled 34 in the locked position.

Figure 9A:
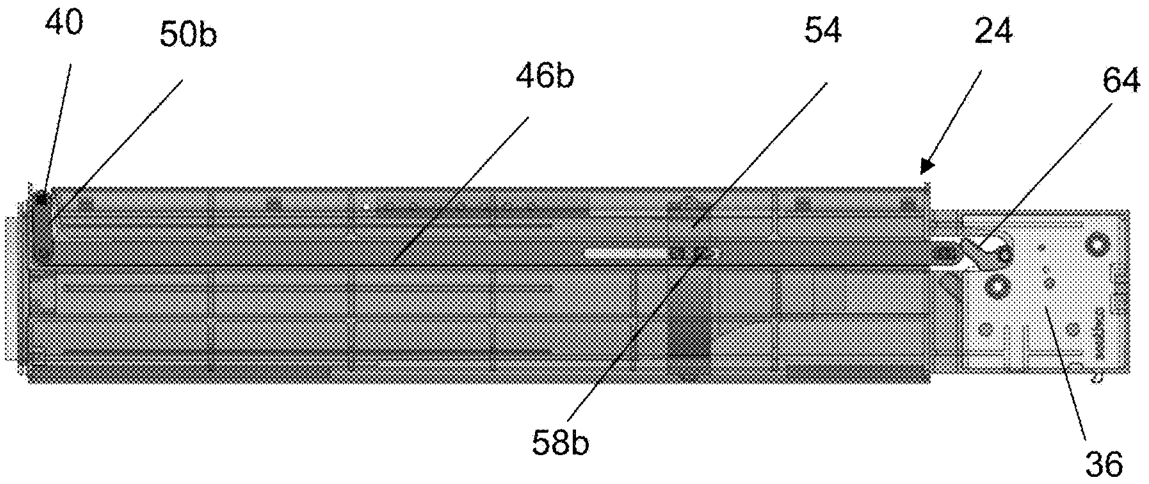
FIGS. 9*a* to 9*c* are partly transparent side views of the bin assembly shown in FIG. 5*b* in different conditions of use.
Figure 9B:
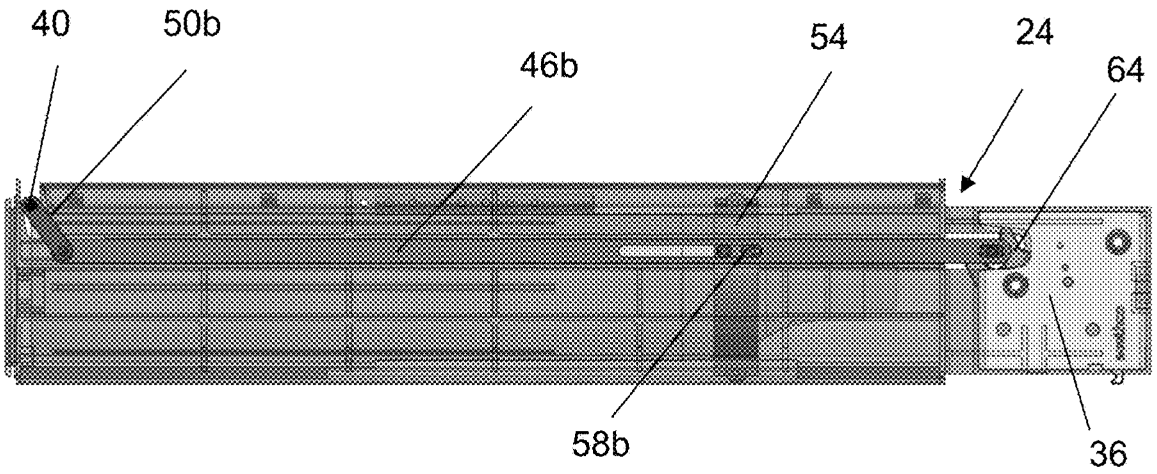
Figure 9C:
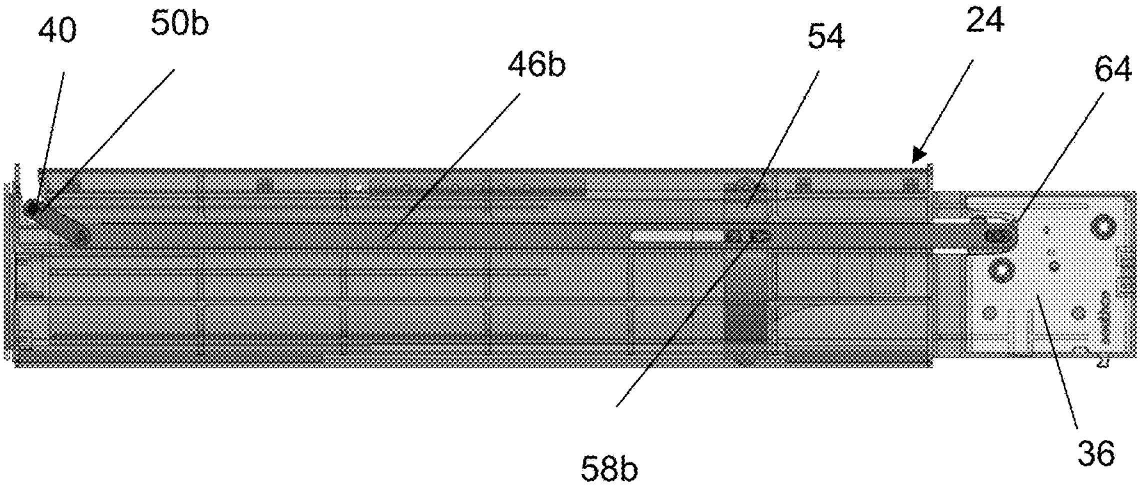
Figure 10:
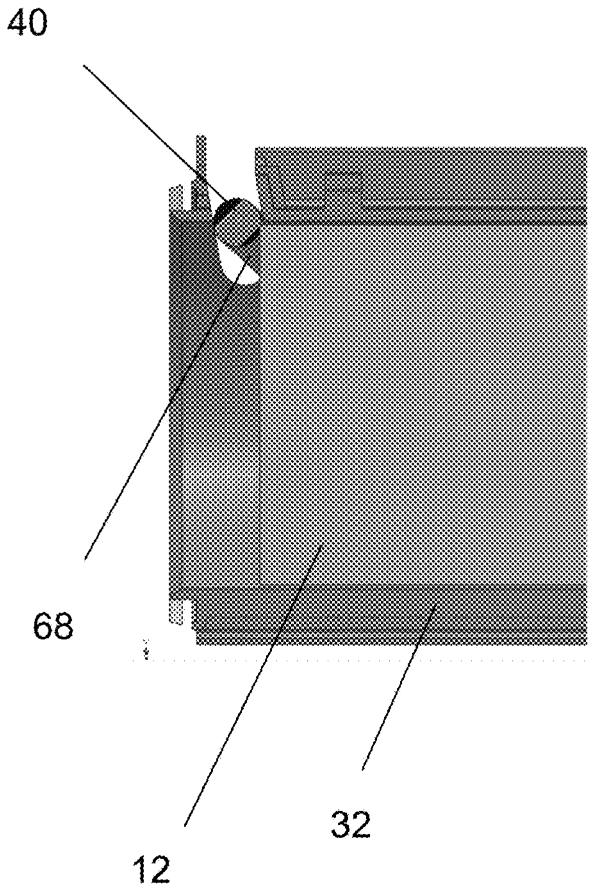
FIG. 10 is an enlarged view of the bin assembly shown in FIG. 8*b* in another condition of use.
Figure 11:
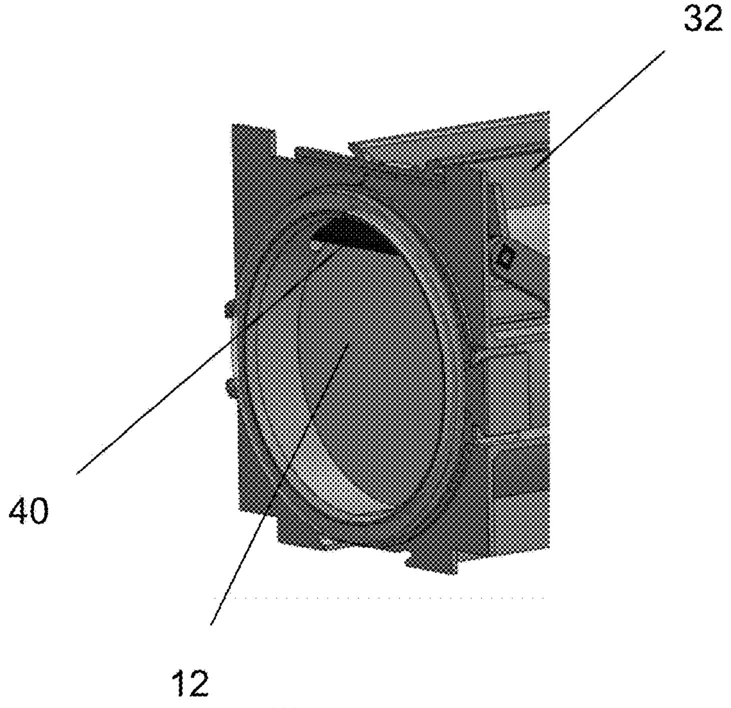
FIG. 11 is an enlarged end perspective view of the bin assembly shown in FIG. 5*a;*
Figure 12A:
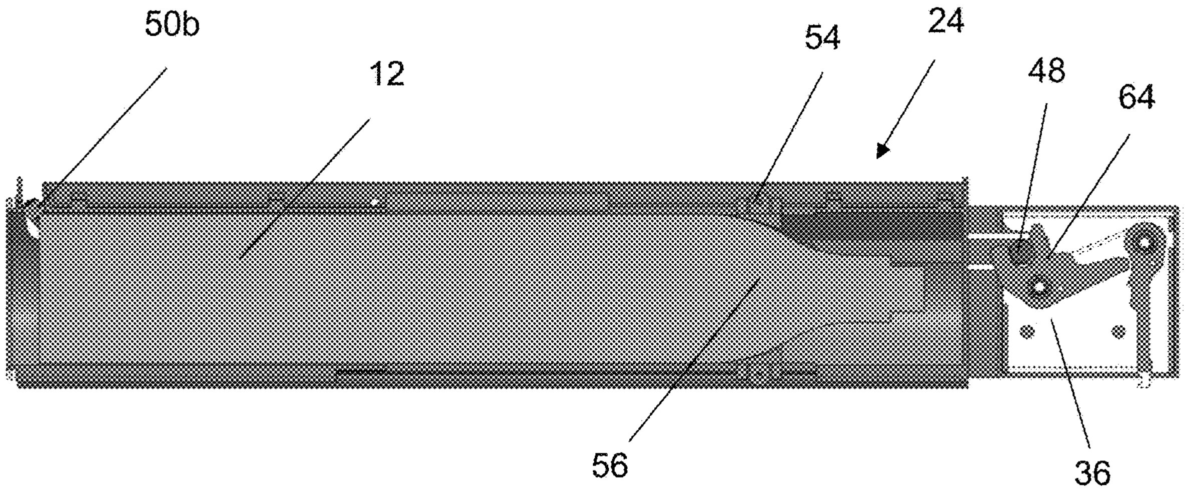
FIGS. 12*a* to 12*c* are section views through the line A-A of the bin assembly shown in FIG. 5*a* in different conditions of use.
Figure 12B:
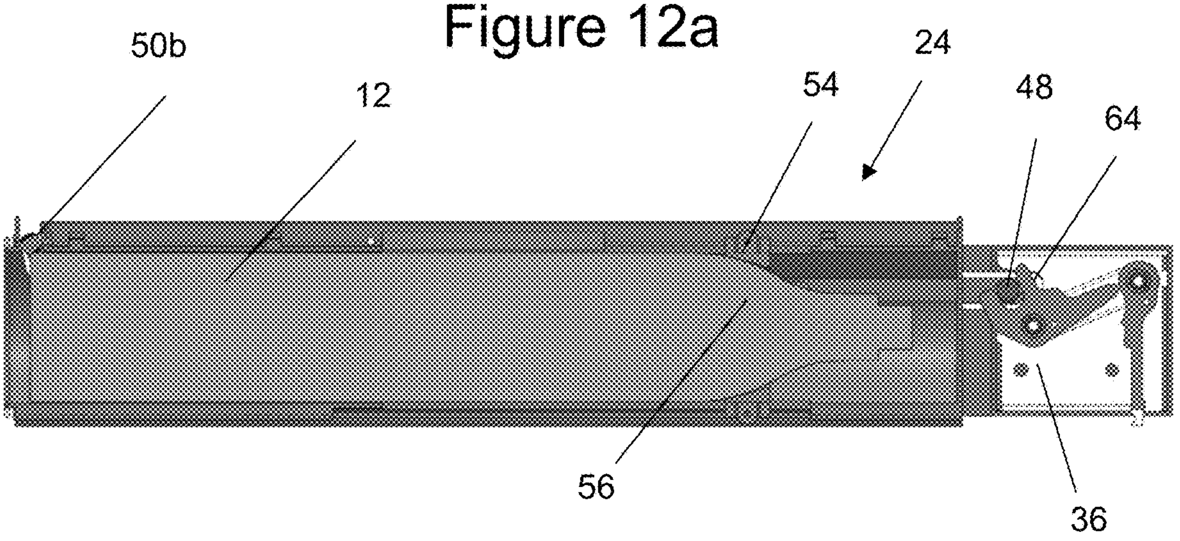
Figure 12C:
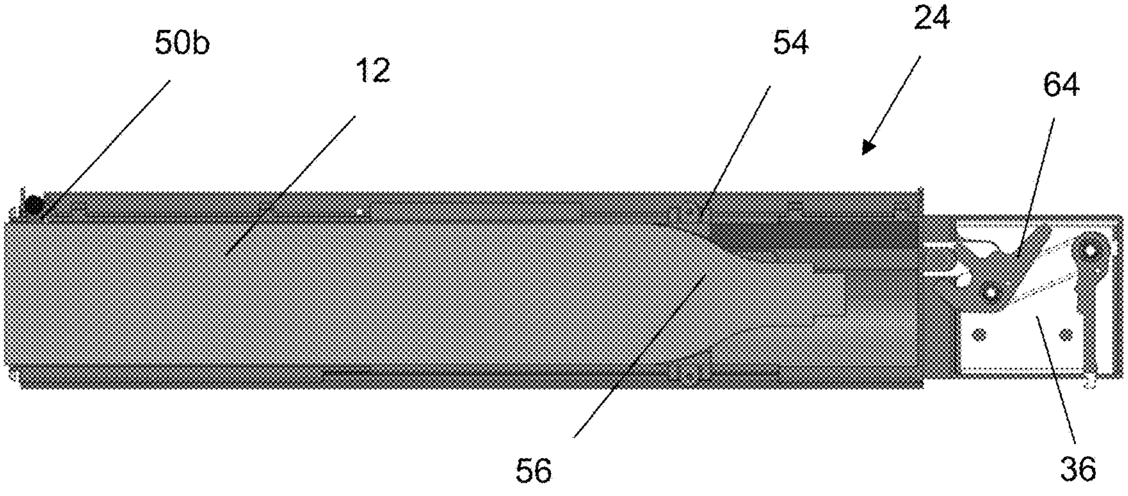

As shown in FIGS. 9*a* to 9*c*, translation of the sled 34 towards the locked position pulls a locking bar 40 at least partially over the open end 42 of the tubular chassis 32 so as to secure the $CO_2$ gas cylinder 12 therein.

The locking system 28 also includes a tension spring 44 that resiliently urges the sled 34 away from the locked position. The tension spring 44 acts to drive the sled 34 towards the open end 42 of the chassis 32 when the locking system 28 releases the $CO_2$ gas cylinder 12. This facilitates easy removal of the $CO_2$ gas cylinder 12 from the vending machine 14.

Figure 6:
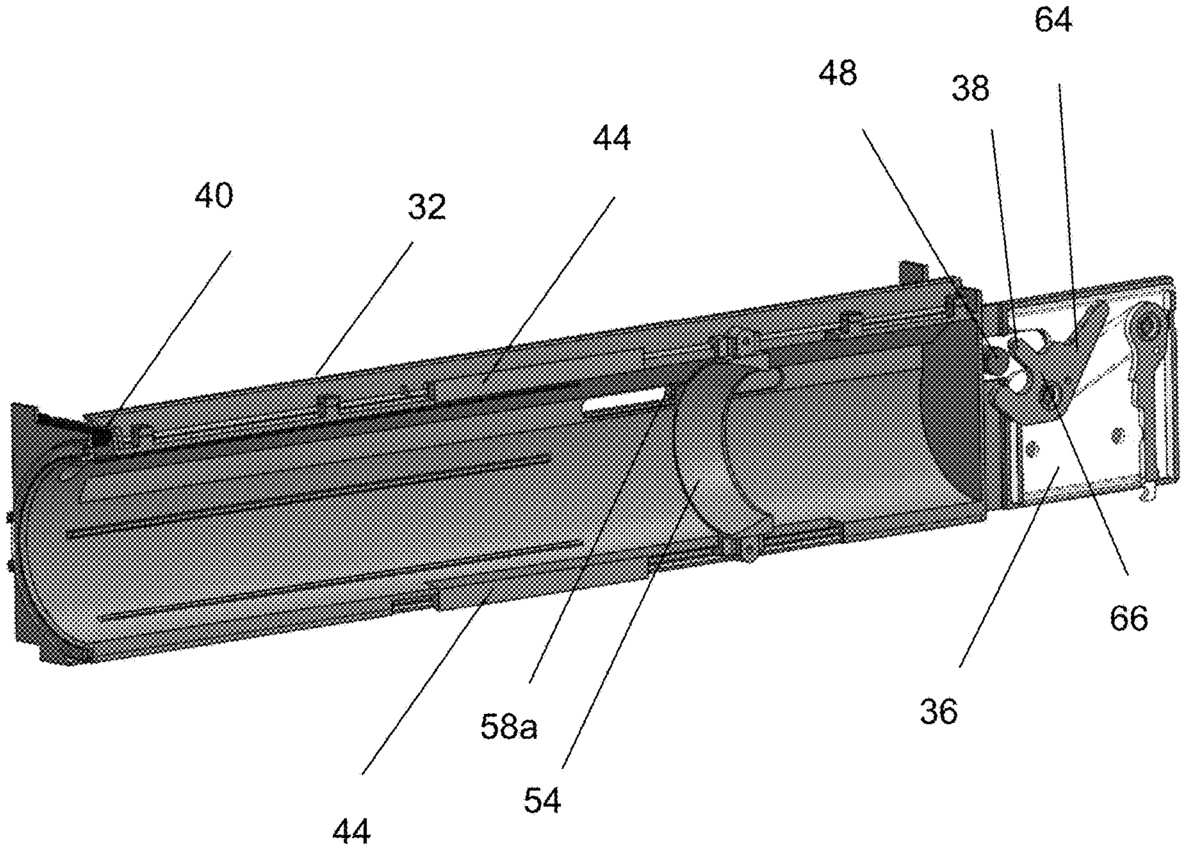
FIG. 6 is a section view of the bin assembly shown in FIG. 5*b* through the line A-A.

As shown in FIGS. 6 and 7, the sled includes:

(a) two parallel long linkage members 46*a*, 46*b* separated at a common end by a latching bar 48, the long linkage members extending along opposed sides of the tubular chassis 32;

(b) two parallel short linkage members 50*a*, 50*b* pivotally secured at a common end to respective other ends of the of the long linkage members 46*a*, 46*b;*

(c) a locking bar 40 coupled between other ends of the short linkage members 50*a*, 50*b*; and (d) a collar 54 shaped to receive a necked section 56 of a $CO_2$ gas cylinder 12 when inserted into the tubular chassis 32.

The collar 54 includes pair of pins 58*a*, 58*b* that extend in opposite directions into respective slots 60*a*, 60*b* of the long linkage members 46*a*, 46*b*. The collar 54 is adapted to translate with respect to the long linkage members 46*a*, 46*b* along the length of the slots 60*a*, 60*b*.

When a $CO_2$ gas cylinder 12 is inserted into the tubular chassis 32, the necked section 56 of the cylinder 12 engages the collar 54 and the collar 54 is subsequently urged to translate along the slots 60*a*, 60*b* towards the latching bar 48 on the sled 34. Further, when the pins 58*a*, 58*b* of the collar 54 abut terminal end sections 62 of the slots 60*a*, 60*b*, the cylinder 12 drives the sled 34 another 20 mm, for example, towards the rotary latch 36, and the latching bar 48 engages an actuator arm 64 of the rotary latch 36 and urges it towards a locked position.

The double action of latching and locking of the locking system 28 secures the $CO_2$ gas cylinder 12 in the vending machine 14. Although the locking system 28 has been above described in terms of the sled 34 translating through the chassis 32 and latching to the rotary latch 36 and pulling down of the locking bar 40, other methods for releasably securing the $CO_2$ gas cylinders 12 in the vending machine 14 are anticipated. For example, the $CO_2$ gas cylinders 12 may be secured in the vending machine 14 by the locking system 28 from one end of the $CO_2$ gas cylinder 12 only.

The authentication system 30 includes:

(a) a latching sensor 66 for detecting the state of the rotary latch 36; and (b) a locking sensor 68 for determining the state of the locking bar 40.

The latching sensor 66 and the locking sensor 68 confirm that an item inserted into the tubular chassis 32 is a legitimate $CO_2$ gas cylinder 12 when the sled 34 is in the locked position and the locking bar 40 at least partially overlies the open end 42 of the tubular chassis 32 so as to block removal of the cylinder 12.

Figure 15:
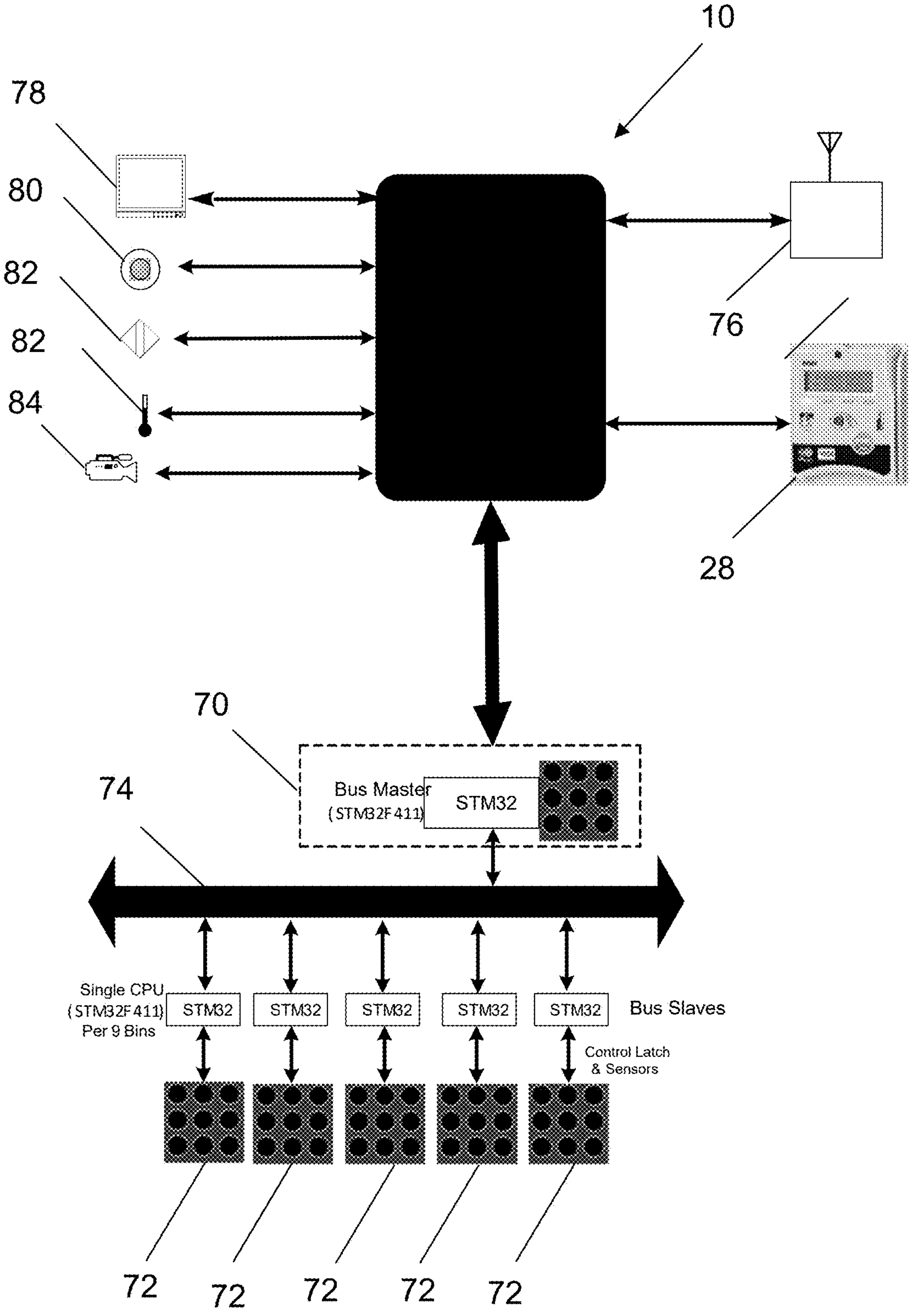
FIG. 15 is a schematic diagram showing component parts of the system shown in FIG. 1.

As shown in FIG. 15, the authentication system 30 alternatively, or in addition to, includes one or more of the sensors 82 in communication with the controller 16 by way of a $I^2C$ interface or a GPIO, for example:

(a) eddy current sensors;

(b) Hall effect sensors;

(c) micro switches;

(d) weight sensors;

(e) bar code readers; and/or (f) image sensor.

These sensors act to confirm that the item inserted into the chassis 22 is a legitimate $CO_2$ gas cylinder 12.

In one embodiment, the array 22 of bin assemblies 24 is made up of a plurality of clusters 72 of sub-arrays of bin assemblies. For example, each cluster includes nine bin assemblies 24. The clusters 72 are modular and can be separately removed from the array 22 for repair, for example.

Figure 14A:
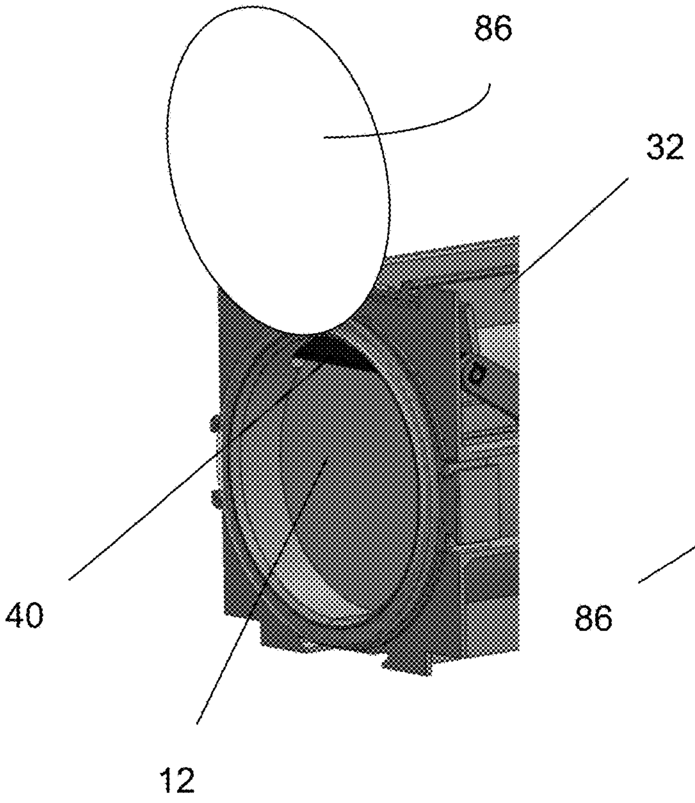
FIGS. 14*a* & 14*b* are enlarged end perspective views of an alternative bin assembly in different conditions of use.
Figure 14B:
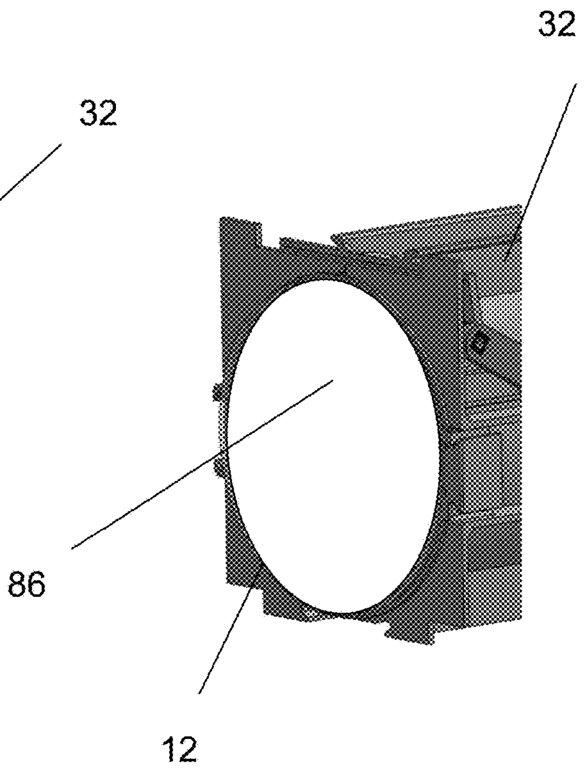

In the embodiment shown in FIGS. 14*a* and 14*b*, each bin assembly 24 includes a door 86 that is operable between open and closed conditions of use. In the closed condition of use, the door 86 overlies the open end 42 of the tubular chassis 32 and inhibits ingress of external elements into the bin assembly 24. For example, the door 86 inhibits entry of rain and dust into the bin assembly 24 when in the closed position. The door is preferably IP66 rated or similar.

When arranged in the open condition of use, the door 86 allows full access to the tubular chassis 32 to facilitate insertion and removal of $CO_2$ gas cylinders 12 into/from the machine 14.

Each bin assembly 24 includes an actuator (not shown) that drives the door 86 between the open and closed conditions of use. The actuator is in communication with the controller 16 which governs its operation.

Advantageously, the locking system 28 includes use of the door 86 to secure a $CO_2$ gas cylinder in a tubular chassis 32 of a bin assembly.

Figure 13:
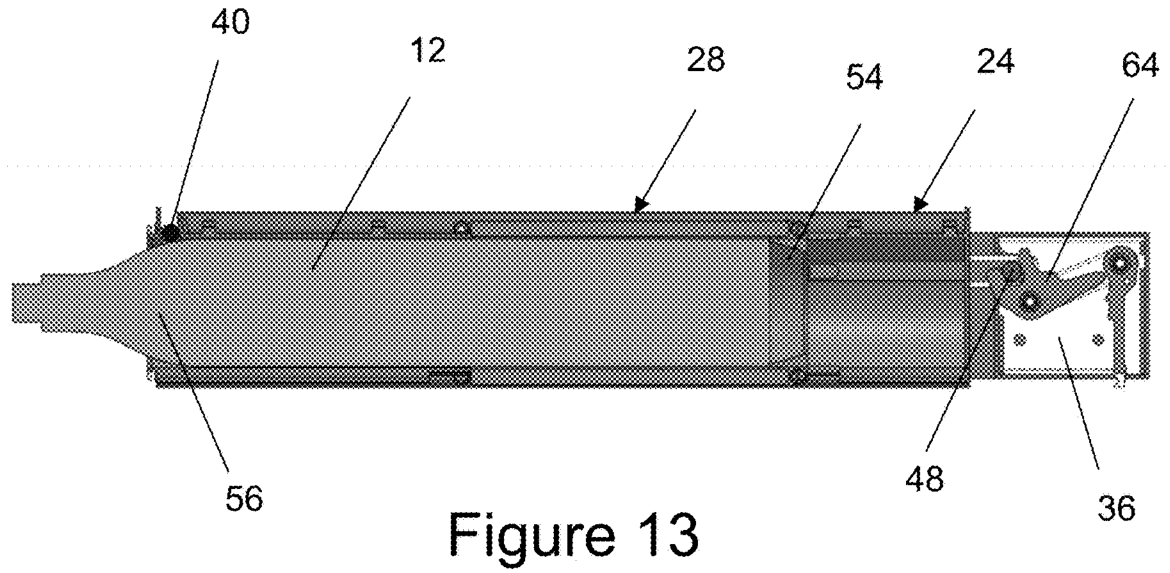
FIG. 13 is a section views through the line A-A of the bin assembly shown in FIG. 5*b* in different conditions of use.

As shown in FIG. 13, if a user inserts the cylinder 12 the wrong way, the locking system 28 will not be able to lock the cylinder 12 in the chassis 32 and the process will abort.

Advantageously, the user interface 18 is a hands free interface that operates from voice commands or hand gestures.

Advantageously, the instead of a rotary latch 36, the bin assemblies 24 include a worm drive.

Controller 16

In the example shown in FIG. 15, the system 10 incudes:

(a) a controller 16 includes a Raspberry Pi 4 Model B 2 GB that includes:
   - (i) 1.5 GHz quad-core ARM Cortex-A72 CPU
   - (ii) VideoCore VI graphics
   - (iii) 4 kp60 HEVC decode
   - (iv) True Gigabit Ethernet
   - (v) 2.4 GHz and 5.0 GHz IEEE 802.11ac wireless, Bluetooth 5.0, BLE
   - (vi) 2×USB 3.0 and 2×USB 2.0 ports
   - (vii) 2×micro-HDMI ports (1×4 kp60 or 2×4 kp30)
   - (viii) USB-C for input power, supporting 5.1V 3A operation
   - (ix) LPDDR4 RAM 4 GB The controller 16 is in communication with the bin assemblies 24 by way of the a Bus Master. This would normally be the closest set of 9 bins to the Controller 16.

The protocol between the Controller 16 and the Bus Master 70 supports the ability to communicate via RS485 Bus 74 which can send and receive data from each individual Bin assembly 24 back through the Bus Master 70 to the controller 16.

The system 10 supports the ability for remote updating of both Firmware and Applications, where required.

As shown in FIG. 15, the user interface 18 includes a touch screen 78 and touchless sensors 80 that are configured to interface with the controller 16 through respective USB and GPIO interfaces.

The controller 16 is preferably in communication with a facial recognition system 84 by way of a MIPI/DSI interface.

The controller 16 is preferably a control module including a central processing unit. For example, the controller 16 includes a Broadcom BCM2711 or similar and the CPU for cluster of nine bins 24 will be a STM32F411 or similar. The central processing unit is in communication with non-transient data storage that include instructions stored there on that engage the system components to perform the steps 100 shown in FIG. 3.

Alternatively, the controller 16 includes a plurality of central processing units each in communication with non-transient data storage that include instructions stored there on that engage the system components to perform the steps 100 shown in FIG. 3.

Further, the controller can include a field programmable gate array that has been configured to engage the system components to perform the steps 100 shown in FIG. 3.

Payment System 20

As shown in FIG. 2, the payment system 20 includes a payment terminal in communication with the controller 16 via a USB port or a TTL UART. The payment system 20 uses standard systems for effecting point of sale transactions.

Vending Machine 14

As shown in FIG. 2, the vending machine 14 has an open front to allow entry and exit of $CO_2$ gas cylinders. The vending machine 14 preferably provides the following advantages:

- The location of the cylinders 12 is known at any time-both empty and full
- The transactions occur in real time
- Data on each exchange is recorded by the machine, including customer info, for later use which can help to determine behavioural patterns (when customers are likely to complete a transaction and demographics
- The vending machine 14 is adapted to send realtime information back to a central server, reporting on stock levels and the condition of the machine.
- The vending machine is adapted to receive information from the central server that can be used to control the operation of the machine, including the price real-time (anytime)—option for different prices in different locations
- Camera in vending machine (face recognition)—complete a transaction with customers consent
- Face recognition to determine height of person which allows the machine to eject a cylinder or request insertion of cylinder based on that person's height (wheelchair as example)
- Confirmation of person standing in front of vending machine (vending machine issuing random number, person keys into mobile to confirm they are physically there) User credits can be in the form of gift cards, or a credit to a bank account or credit/debit card
- Loyalty Card Alternatively, the vending machine 14 includes one of more doors (not shown) to safe guard the array 22 of bin assemblies 24 from exposure to the elements. Each door is hinged to allow access to the bin assemblies 24. Each door is biased so as to default closed position covering the bin assemblies 24.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF PARTS

10 Vending machine system
12 CO2 gas cylinder
14 Vending Machine
16 Controller
18 User interface
20 Payment system
22 Array of bin assemblies
24 Bin assembly
25 Swap function button
26 End of CO2 gas cylinder
28 Locking system
30 Authentication system
31 New function button
32 Tubular chassis
34 Sled
36 Rotary latch
38 Latching arm
40 Locking bar
42 Open end of the chassis
44 Tension spring

46*a*, 46*b* Long linkage member
48 Latching bar
50*a*, 50*b* Short linkage member
54 Collar
56 Necked section
58*a*, 58*b* Pin
60*a*, 60*b* Slot
62 Terminal end section
64 Actuator arm
66 Latching sensor
68 Locking sensor
70 Bus Master
72 Cluster
74 RS485 Bus
76 4G/5G interface
78 Touch screen
80 Touchless sensors
82 Sensors
84 Facial recognition system

What is claimed is:

1. A vending machine system for exchanging $CO^2$ gas cylinders, the system including a controller in communication with a user interface, a payment system and an array of bin assemblies, wherein each one of the bin assemblies is shaped to at least partially receive an end of a $CO^2$ gas cylinder and includes a locking system for releasably securing therein a $CO^2$ gas cylinder, said system for performing the steps of:
(a) receiving user input through the user interface; and
(b) if the user input represents a desire to exchange a $CO^2$ gas cylinder, then the system performs the steps of:
(i) receiving payment from the user through the payment system for a replacement $CO^2$ gas cylinder;
(ii) receiving a $CO^2$ gas cylinder in a first one of said bin assemblies; and
(iii) the locking system releasing a full $CO^2$ gas cylinder located in a second one of said bin assemblies for collection by the user,
wherein each bin assembly in the array includes a tubular chassis shaped to receive and seat therein a $CO^2$ gas cylinder, and
wherein the locking system of each bin assembly in the array includes a sled that engages the $CO^2$ gas cylinder as it is inserted in to the tubular chassis and translates with respect to the tubular chassis towards a locked position.

2. The system claimed in claim 1, wherein step (ii) is performed by the system before step (i).

3. The system claimed in claim 2, wherein step (a) of receiving user input is the same as the step (ii) of receiving a $CO^2$ gas cylinder.

4. The system of claim 3, wherein each one of the bin assemblies includes an authentication system for confirming that an item received therein is a legitimate $CO^2$ gas cylinder, said system for performing the step of:
(a) confirming through the authentication system that the item received in step (ii) is a legitimate $CO^2$ gas cylinder.

5. The system of claim 3, including an authentication system for confirming that an item to be received in one of the bin assemblies is a legitimate $CO^2$ gas cylinder, said system for performing the step of:
(a) confirming through the authentication system that the item to be received in step (ii) is a legitimate $CO^2$ gas cylinder.

6. The system of claim 5, wherein the second one of said bin assemblies is a bin assembly in the array that is closest to the first one of said bin assemblies where the legitimate $CO^2$ gas cylinder was retuned.

7. The system of claim 6, wherein if said user input represents a desire to purchase a full $CO^2$ gas cylinder without replacement, then the system performs the steps of:
(a) receiving payment from the user through the payment system for a full $CO^2$ gas cylinder without replacement; and
(b) the locking system releasing a full $CO^2$ gas cylinder located in a third one of said bin assemblies for collection by the user.

8. A vending machine system for purchasing a $CO^2$ gas cylinder, the system including a controller in communication with:
(a) a user interface;
(b) a payment system; and
(c) an array of bin assemblies, wherein each one of bin assemblies is shaped to at least partially receive an end of a $CO^2$ gas cylinder and includes a locking system for releasably securing therein a $CO^2$ gas cylinder, said system for performing the steps of:
(a) receiving user input through the user interface; and
(b) if the user input represents a desire to purchase a $CO^2$ gas cylinder, then the system performs the steps of:
(i) receiving payment from the user through the payment system for a $CO^2$ gas cylinder; and
(ii) the locking system releasing a $CO^2$ gas cylinder located in a one of said bin assemblies for collection by the user,
wherein each bin assembly in the array includes a tubular chassis shaped to receive and seat therein a $CO^2$ gas cylinder, and
wherein the locking system of each bin assembly in the array includes a sled that engages the $CO^2$ gas cylinder as it is inserted in to the tubular chassis and translates with respect to the tubular chassis towards a locked position.

9. The system of claim 8, said system further including a height measurement system for measuring a height of a customer and wherein the controller releases the full $CO^2$ gas cylinder from a bin in the array that is closest to the height of the user.

10. The system of claim 9, wherein if said user input represents a desire to return an empty $CO^2$ gas cylinder without replacement, then the system performs the steps of:
(a) receiving an item in one of said bin assemblies;
(b) confirming through an authentication system that the item is a legitimate $CO^2$ gas cylinder;
(c) the locking system locking the $CO^2$ gas cylinder in said one of said bin assemblies;
(d) issuing a credit to the user through the payment system for return of $CO^2$ gas cylinder without replacement.

11. A vending machine system for receiving spent $CO^2$ gas cylinders, the system including a controller in communication with:
(a) a user interface;
(b) a payment system; and
(c) an array of bin assemblies, wherein each one of bin assemblies is shaped to at least partially receive an end of a $CO^2$ gas cylinder and includes a locking system for releasably securing therein a $CO^2$ gas cylinder, said system for performing the steps of:
(a) receiving user input through the user interface; and
(b) if the user input represents a desire to return a $CO^2$ gas cylinder, then the system performs the steps of:
(i) receiving an item in one of said bin assemblies;

(ii) the locking system locking the $CO^2$ gas cylinder in said one of said bin assemblies;

(iii) issuing a credit to the user through the payment system for return of $CO^2$ gas cylinder without replacement, wherein each bin assembly in the array includes a tubular chassis shaped to receive and seat therein a $CO^2$ gas cylinder, and wherein the locking system of each bin assembly in the array includes a sled that engages the $CO^2$ gas cylinder as it is inserted in to the tubular chassis and translates with respect to the tubular chassis towards a locked position.

12. The system claimed in claim 11, wherein step (a) of receiving user input is the same as the step (i) of receiving a $CO^2$ gas cylinder.

13. The system claimed in claim 11, wherein the sled is in the locked position when the $CO^2$ gas cylinder is fully inserted into the tubular chassis.

14. The system claimed in claim 13, wherein the locking system of each bin assembly in the array includes a rotary latch that is engaged by the sled as it translates towards the locking position, and wherein a latching arm of the rotary latch secures the sled in the locked position.

15. The system claimed in claim 11, wherein translation of the sled towards the locked position pulls a locking bar at least partially over an opening of the tubular chassis so as to secure the $CO^2$ gas cylinder therein.

16. The system of claim 15, wherein the tubular chassis includes a tension spring that resiliently urges the sled away from the locked position.

17. The system of claim 16, wherein the sled includes:

(a) two parallel long linkage members separated at a common end by a latching bar, the long linkage members extending along opposed sides of the tubular chassis;

(b) two parallel short linkage members pivotally secured at a common end to respective other ends of the long linkage members;

(c) a locking bar coupled between other ends of the short linkage members; and (d) a collar shaped to receive a necked section of a $CO^2$ gas cylinder when inserted into the tubular chassis;

wherein the collar includes a pair of pins extending in opposite directions into respective slots of the long linkage members, wherein, when a $CO^2$ gas cylinder is inserted into the tubular chassis, the necked section of the $CO^2$ gas cylinder engages the collar and the collar is subsequently urged towards the latching bar, and when the pins of the collar abut terminal end sections of the slots, the $CO^2$ gas cylinder drives the sled towards the rotary latch, and the latching bar engages an actuator arm of the rotary latch and urges it towards a locked position.

18. The system of claim 17, wherein the authentication system includes:

(a) a latching sensor for detecting the state of the rotary latch; and (b) a locking sensor for determining the state of the locking bar, wherein the latching sensor and the locking sensor confirm that an item inserted into the tubular chassis is a legitimate $CO^2$ gas cylinder when the sled is in the locked position and the locking bar at least partially overlies the open end of the tubular chassis.

19. The system of claim 18, wherein the authentication system includes one or more of the following:

(a) micro switches;

(b) weight sensors;

(c) eddy current sensors;

(d) Hall effect sensors;

(e) bar code readers; and/or (f) image sensor.

20. The system of claim 19, wherein the array of bin assemblies is made up of a plurality of clusters of sub-arrays of bin assemblies.

21. The system claimed in claim 20, wherein the clusters are modular and can be separately removed from the array for repair.

22. A vending machine, including the system claimed in claim 21.

23. A bin assembly for an array of bin assemblies of a $CO^2$ gas cylinder vending machine system, wherein the bin assembly is shaped to at least partially receive an end of a $CO^2$ gas cylinder and includes a locking system for releasably securing therein a $CO^2$ gas cylinder, wherein the bin assembly includes a tubular chassis shaped to receive and seat therein a $CO^2$ gas cylinder, and wherein the locking system includes a sled that engages the $CO^2$ gas cylinder as it is inserted in to the tubular chassis and translates with respect to the tubular chassis towards a locked position.

24. The bin assembly of claim 23, including an authentication system for confirming that an item received therein is a legitimate $CO^2$ gas cylinder.

25. The bin assembly of claim 23, wherein the sled is in the locked position when the $CO^2$ gas cylinder is fully inserted into the tubular chassis.

26. The bin assembly of claim 25, wherein the locking system includes a rotary latch that is engaged by the sled as it translates towards the locking position, and wherein a latching arm of the rotary latch secures the sled in the locked position.

27. The bin assembly of claim 26, wherein translation of the sled towards the locked position pulls a locking bar at least partially over an opening of the tubular chassis so as to secure the $CO^2$ gas cylinder therein.

28. The bin assembly of claim 27, wherein the tubular chassis includes a tension spring that resiliently urges the sled away from the locked position.

29. The bin assembly of claim 28, wherein the sled includes:

(a) two parallel long linkage members separated at a common end by a latching bar, the long linkage members extending along opposed sides of the tubular chassis;

(b) two parallel short linkage members pivotally secured at a common end to respective other ends of the long linkage members;

(c) a locking bar coupled between other ends of the short linkage members; and (d) a collar shaped to receive a necked section of a $CO^2$ gas cylinder when inserted into the tubular chassis;

wherein the collar includes a pair of pins extending in opposite directions into respective slots of the long linkage members, wherein, when a $CO^2$ gas cylinder is inserted into the tubular chassis, the necked section of the $CO^2$ gas cylinder engages the collar and the collar is subsequently urged towards the latching bar, and when the pins of the collar abut terminal end sections of the slots, the $CO^2$ gas cylinder drives the sled towards the rotary latch, and the latching bar engages an actuator arm of the rotary latch and urges it towards a locked position.

30. The bin assembly of claim 29, wherein the authentication system includes:

(a) a latching sensor for detecting the state of the rotary latch; and (b) a locking sensor for determining the state of the locking bar, wherein the latching sensor and the locking sensor confirm that an item inserted into the tubular chassis is a legitimate $CO^2$ gas cylinder when the sled is in the locked position and the locking bar at least partially overlies the open end of the tubular chassis.

31. The bin assembly of claim 30, wherein the authentication system includes one or more of the following:

(a) eddy current sensors;

(b) Hall effect sensors;

(c) micro switches;

(d) weight sensors;

(e) bar code readers; and/or (f) image sensor.

32. An array of bin assemblies, each as claimed in claim 31.

* * * * *